(12) United States Patent
Napier et al.

(10) Patent No.: US 8,403,519 B2
(45) Date of Patent: Mar. 26, 2013

(54) CONDUCTIVE CABLE SYSTEM FOR SUSPENDING A LOW VOLTAGE LUMINAIRE ASSEMBLY

(75) Inventors: Hugo Napier, Santa Barbara, CA (US); Ryan Kwast, Santa Barbara, CA (US)

(73) Assignee: Griplock Systems, LLC, Carpinteria, CA (US)

( * ) Notice: Subject to any disclaimer, the term of this patent is extended or adjusted under 35 U.S.C. 154(b) by 704 days.

(21) Appl. No.: 12/626,283

(22) Filed: Nov. 25, 2009

(65) Prior Publication Data

US 2011/0122608 A1 May 26, 2011

(51) Int. Cl.
*F21L 4/02* (2006.01)
(52) U.S. Cl. ..... 362/184; 362/391; 362/407; 174/110 R; 174/128.1
(58) Field of Classification Search .................. 362/184, 362/391, 407; 174/110 R, 128.1
See application file for complete search history.

(56) References Cited

U.S. PATENT DOCUMENTS

| | | | |
|---|---|---|---|
| 1,691,869 A | 11/1928 | Fowle | |
| 2,250,907 A | 7/1941 | Edwards | |
| 2,396,734 A | 3/1946 | Williams, Jr. | |
| 3,261,908 A | 7/1966 | Roche et al. | |
| 3,339,012 A | 8/1967 | Hutchins, Jr. | |
| 5,430,256 A | 7/1995 | Taylor et al. | |
| 6,642,456 B2 | 11/2003 | Valadez et al. | |
| 6,734,366 B2 | 5/2004 | Kikuchi et al. | |
| 7,462,781 B2 | 12/2008 | Varkey et al. | |
| 2005/0109530 A1 | 5/2005 | Maeda | |
| 2006/0000634 A1 | 1/2006 | Arakawa | |

FOREIGN PATENT DOCUMENTS

GB 2138199 10/1984

*Primary Examiner* — Meghan Dunwiddie
(74) *Attorney, Agent, or Firm* — Lee & Hayes, PLLC

(57) ABSTRACT

A low voltage cable for providing low voltage power to an electrically-powered assembly, such as a luminaire fixture, and for attaching the luminaire fixture to the cable and to structure using a cable gripping device in such a way that the assembly can be adjusted. is disclosed. The cable comprises a conductive strand composed of a first metallic material, and a plurality of strength strands wound around the conductive strand, where the plurality of strength strands is of a second metallic material. The first metallic material is substantially more conductive than the second metallic material, and the second metallic material has substantially greater tensile strength than the first metallic material. This allows the cable to conduct a low voltage feed across the conductive strand, and allows the strength strands cable to mostly support the tension load particularly of a hanging luminaire fixture as well as resisting lateral compressive forces from a cable gripping device.

19 Claims, 9 Drawing Sheets

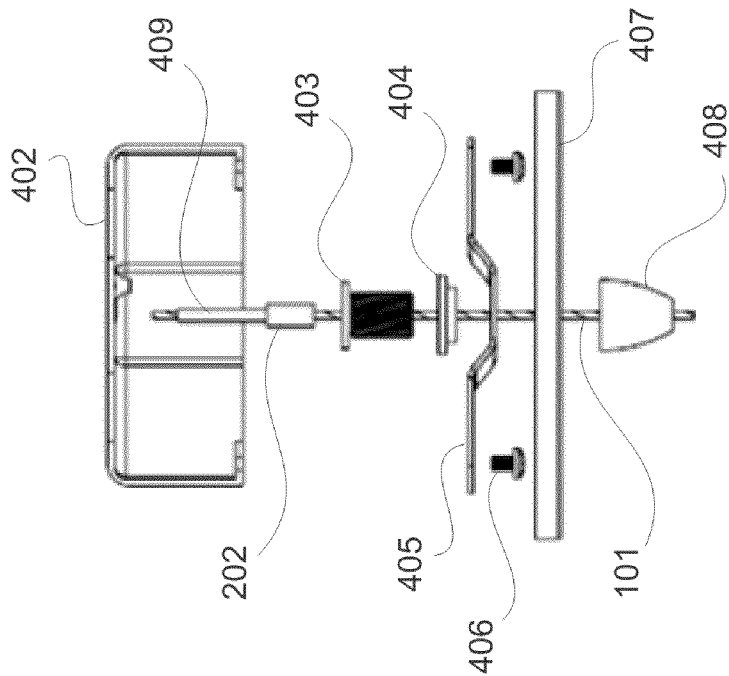
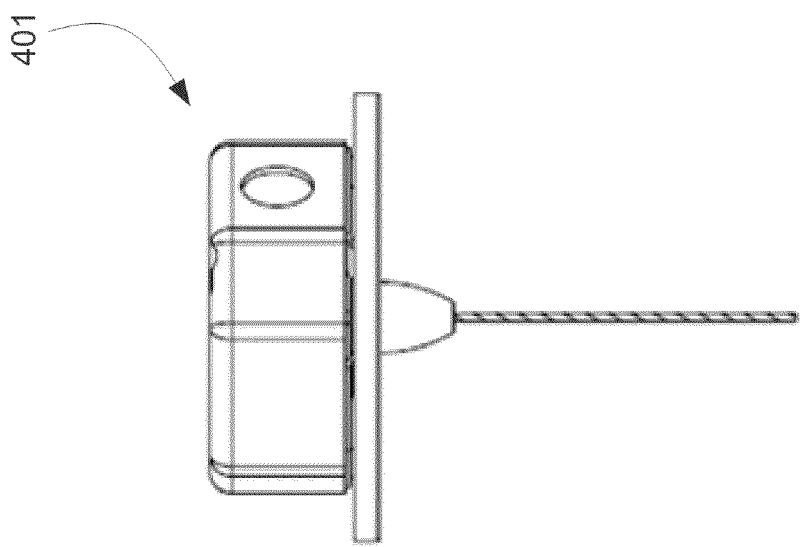
FIGURE 4B
FIGURE 4A

CONDUCTIVE CABLE SYSTEM FOR SUSPENDING A LOW VOLTAGE LUMINAIRE ASSEMBLY

TECHNICAL FIELD

The presently disclosed subject matter relates to low voltage suspension system particularly for, but not limited to, luminaire assemblies. More particularly, the subject matter relates to a suspension system that includes an uninsulated wire construct for supporting the assembly and for providing the assembly with low voltage power, as well as adjustable cable grippers and non-adjustable cable couplers to attached the wire construct(s) to both supporting structure and luminaire respectively in such a way that the luminaire may be easily adjusted to the desired height.

BACKGROUND

Many electrically-powered assemblies and devices, such as luminaire assemblies, are hung from ceilings or other supporting structures. In order for a luminaire assembly to be hung, the weight of the luminaire assembly must be supported from the supporting structure. In addition, in order to provide light, the luminaire assembly must be provided with power.

Many kinds of supports have been developed to hang luminaire assemblies and to provide them with power. One form of support is an electrical cable configured to provide both power and support to the luminaire assembly. However, electrical cables composed of highly electrical metallic conductors can only suspend luminaires up to approximately 5 pounds. When an electrical cable needs to support more than 5 pounds, a separate suspension or support cable is required, and the electrical cable will require an insulating jacket of a non-metallic material such as a polymer or elastomer.

The use of non-metallic insulators with metallic conductive cables can cause a number of problems with the use of adjustable cable grippers. Specifically, adjustable cable grippers need to come into direct contact with the metallic cable to be effective. When a cable gripper is used on a non-metallically insulated cable it will slip and tear the insulation, eventually lodging against the metal itself and defeating the purpose of the insulation.

The use of mixed strands of metallic cable for both supporting light assemblies and conducting electricity thereto are known. Several attempts to meet the goal of adequate support and strength in the cable, while still providing adequate conductivity are shown in the prior art. However, these attempts do not cure the problems with the use of adjustable grippers.

Several examples from the prior art disclose cables which use a combination of cooper wires and steel wires. Some of those examples depict steel wires and copper wires exposed on the outer layer of the cable. U.S. Pat. No. 2,250,907, issued to Edwards, and U.S. Pat. No. 3,339,012, issued to Hutchins, depict some of those cables. While copper has good electrical conductivity, copper also has a low elastic strength. The presence of the copper on the outer later of the cable means that the exterior of the cable lacks the lateral compression strength required for the cable to be gripped with adjustable grippers.

Other examples in the prior art depict the steel wires on the outer layer of a cable, but those cables are not configured to be gripped by adjustable grippers. U.S. Pat. No. 2,396,734, issued to Williams, and U.S. Patent Application Publication No. 2001/0000590, applied for by Valadez et al, depict some of those cables.

Other examples in the prior art use alternative metallic materials to provide both conduction and tensile strength. However, those alternative metallic materials lack the lateral compressive strength for use with adjustable grippers. U.S. Pat. No. 3,261,908, issued to Roche et al, and U.S. Patent Application Publication No. 2001/0017219, depict some of those cables.

Yet other examples in the prior art require non-metallic insulation which, as discussed above, is destroyed which gripped by an adjustable gripper. U.S. Pat. No. 7,462,781, and U.S. Patent Application Publication No. 2005/0109530, applied for by Maeda, depict some of those cables.

While all of these prior art cables use metallic strands to provide tensile strength for the cable, the prior art cables fail to disclose a cable with sufficient lateral compression strength to be gripped with an adjustable gripper, configured to be gripped by an adjustable gripper, and without the use of a polymer or elastomer insulation. The prior art fails to disclose the outer steel strands as providing protection to the internal conductive strand against the lateral compression forces of an adjustable cable gripping mechanism such as a three-ball compression system.

What is needed in the area of supporting luminaires and other electrical equipment is a conductive cable providing both axial tensile strength and resistance to lateral compression forces that is needed to support a hanging luminaire assembly or other electrical equipment using an adjustable cable gripper.

SUMMARY

The present disclosure relates to a low voltage cable for providing low voltage power to an electrically powered assembly, particularly a luminaire fixture or illuminated sign, and for supporting the luminaire fixture while hanging in such a way that the height may be easily adjusted during installation The cable comprises a conductive strand composed of a first metallic material, and a plurality of strength strands wound around the conductive strand, the plurality of strength strands composed of a second metallic material. The first metallic material is substantially more conductive than the second metallic material, and the second metallic material has substantially greater tensile strength than the first metallic material. This allows the cable to conduct a low voltage feed across the conductive strand, and allows the cable to support the tension load of a hanging luminaire fixture. Although it is preferable to use the cable system to suspend a luminaire assembly, other electronically-powered equipment that could be powered with low voltage electricity, such as other lights, sensors, microphones, decorations, and the like, can be used with the present suspension system.

The present disclosure also relates to a system for an adjustable hanging, particularly a luminaire assembly. The system includes a luminaire fixture assembly or illuminated sign with two or more fixture mounts attached to the luminaire fixture assembly. The system also includes two or more ceiling mounts attached to a ceiling and one or more power sources remote from the luminaire assembly. Two or more of the low voltage cables described above each connect one of the ceiling mounts to one of the fixture mounts in order to hang the luminaire fixture assembly from the ceiling. In addition, the remote power source provides power to a light source inside of the luminaire fixture assembly via low voltage electric feeds directed via the conductive strands of the low voltage cables.

For low voltage electrical systems, a minimum 24AWG conductive cable is required. For the conductive portion of the cable, in this case copper, to be an equivalent 24AWG size the outer diameter of the cable would then be 1.8 mm. The theoretical strength of the 1.8 mm cable alone is 645 pounds. No other conductive cable of this size would be able to support this weight.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects shown. The following figures are included:

FIGS. 4A and 4B illustrate an example ceiling-mounted non-adjustable cable coupler.

DETAILED DESCRIPTION OF ILLUSTRATIVE EMBODIMENTS

Figure 1:
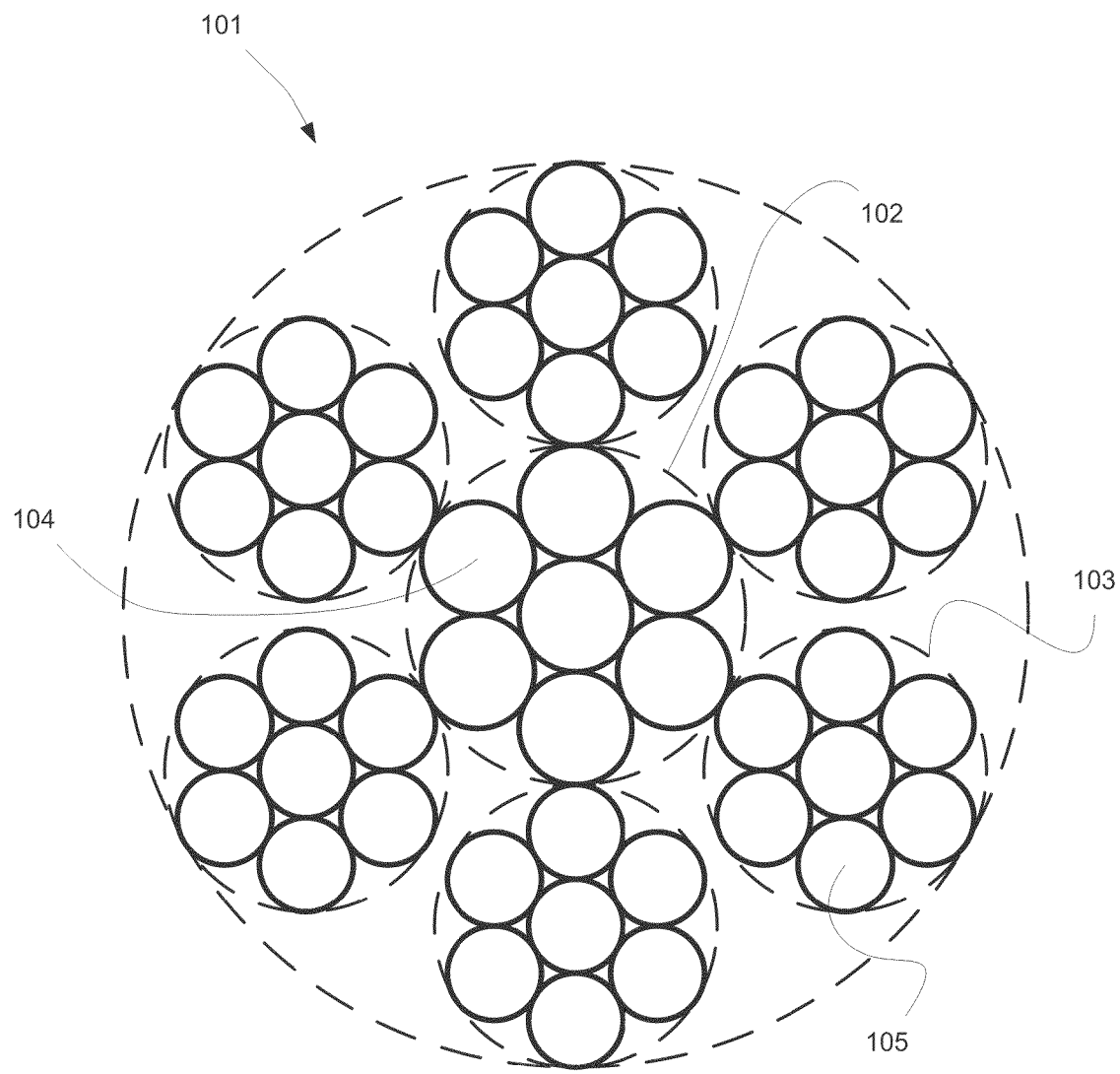
FIG. 1 illustrates a cross section of an example suspension cable.

FIG. 1 depicts a cross section of an example low voltage suspension cable 101. The cable comprises a conductive strand 102 and strength strands 103. The strength strands 103 are wound around conductive strand 102 so that conductive strand 102 is covered. The conductive strand 102 is capable of conducting low voltage electric power. The strength strands 103 are substantially less conductive than the conductive strand 102, and have sufficient tensile strength to support a hanging luminaire assembly from the ceiling. Sufficient tensile strength may be on the order of 500 lbs gross break weight when used with an adjustable cable gripper and a ³⁄₃₂" diameter cable. The strength strands 103 also protect the conductive strand 102 from lateral compression forces imposed by the adjustable cable gripper. The low voltage suspension cable 101 can be configured in a number of different embodiments. Furthermore, other electronically-powered equipment that could be powered with low voltage electricity, such as other lights, sensors, microphones, decorations, and the like, can be used with the present suspension system.

In one embodiment of the low voltage suspension cable 101, conductive strand 102 comprises a plurality of conductive wires 104, and each of the plurality of strength strands comprises a plurality of strength wires 105. The embodiment shown in FIG. 1 depicts conductive strand 102 comprising seven conductive wires 104, and depicts strength strands 103 each comprising seven individual strength wires 105. The configuration of the seven-wire strand includes a center wire and six wires surrounding the center wire.

In another embodiment of the low voltage suspension cable 101, conductive strand 102 comprises seven copper wires with a minimum cross sectional equivalent of 24AWG as required for Class 2 systems. Strength strands 103 each comprise seven 304 stainless steel wires.

Figure 2A:
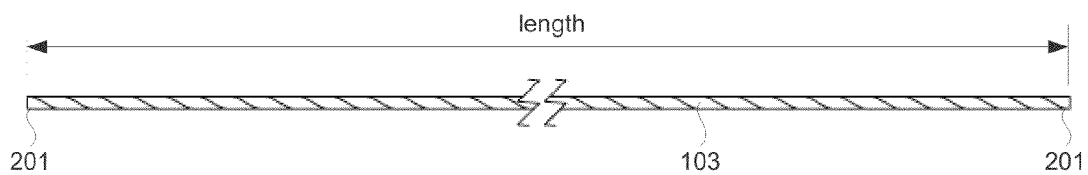
FIGS. 2A and 2B illustrate a side view of two example suspension cables, with one of the two examples showing a swaged sleeve.

FIG. 2A depicts a length of low voltage suspension cable 101. As shown, strength strands 103 are wound such that conductive strand 102 is not exposed. The terminals 201 of low voltage suspension cable 101 can be electro-cut, soldered, or finished in any similar manner or unfinished. The length of the low voltage suspension cable 101 can vary depending on the application in which the cable is used.

Figure 2B:

FIG. 2B depicts a length of low voltage suspension cable 101 which includes a swaged sleeve 202. Swaged sleeve 202 can be used as part of a connector system for connecting the cable to a ceiling or to a luminaire assembly.

Figure 3:
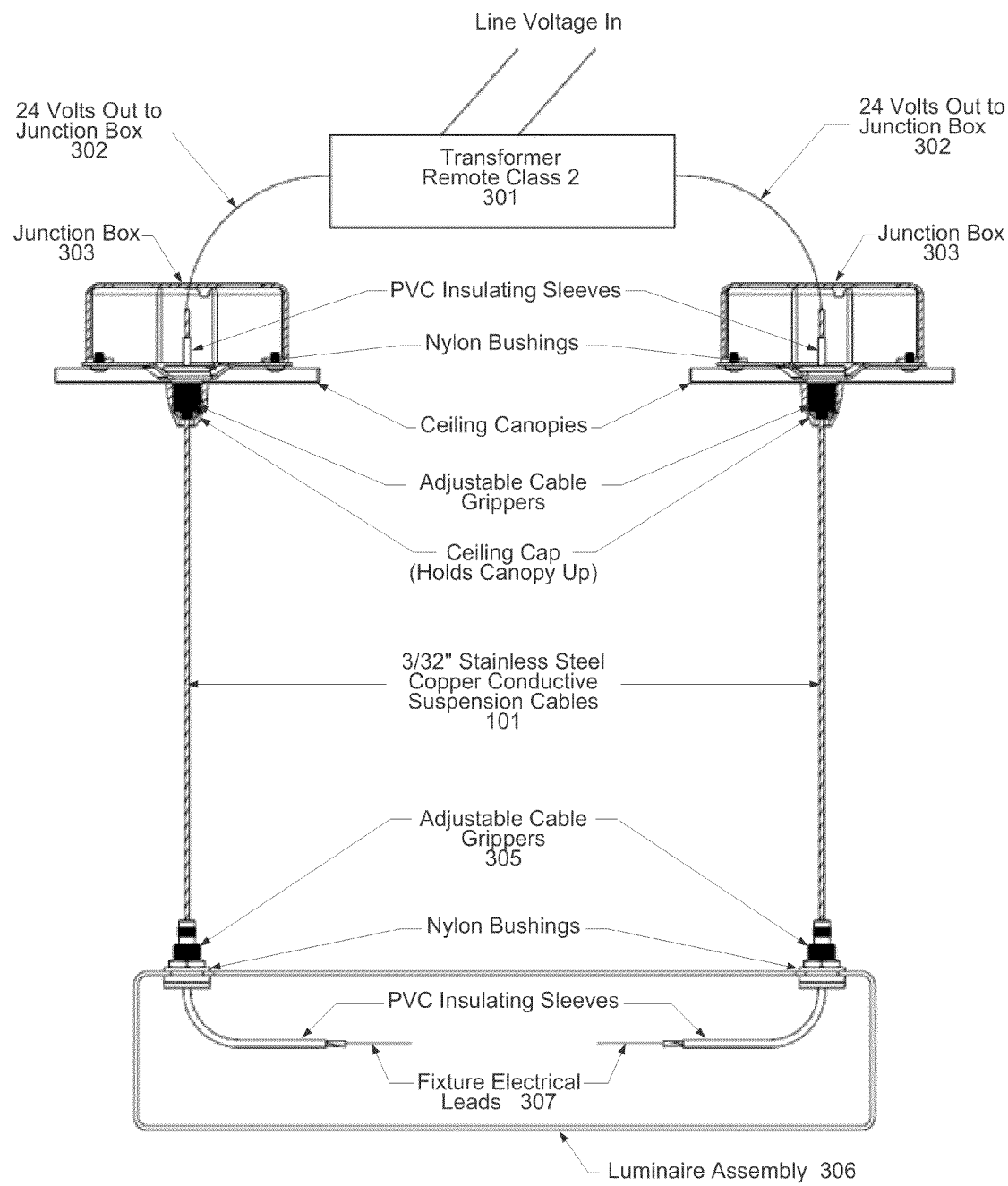
FIG. 3 illustrates an example hanging luminaire assembly.

FIG. 3 depicts an example luminaire assembly system. This system includes a remote power source 301. The remote power source 301 is connected to two electrical leads 302. Electrical leads 302 are directed to ceiling mounts 303. Ceiling mounts 303 securely attach low voltage suspension cables 101 to ceiling or other structure 304 (not shown). In ceiling mounts 303, electrical leads 302 are connected to the conductive core 102 of low voltage suspension cables 101. Fixture mounts 305 securely attach low voltage suspension cables 101 to luminaire assembly 306. Low voltage suspension cables 101 are connected to ceiling mounts 303 and fixture mounts 305 in such a way as to properly support hanging luminaire assembly 306. Electrical leads 307 are connected to the conductive core 102 of low voltage suspension cables 101. Electrical leads 307 are directed inside of luminaire assembly 306 to a lighting element (not shown) of luminaire assembly 306. As depicted in FIG. 3, low voltage suspension cables 101 can support the weight of hanging luminaire assembly 306 and provide low voltage power to luminaire assembly 306.

The remote power source 301 may be any type of low voltage power source. The remote power source may provide direct current feeds via each of the low voltage suspension cables 101, where one or more of the cables provides a positive feed and the other cables provide a negative feed. In one embodiment, the remote power source provides a positive 24-volt direct or alternating current feed on one of the cables, and a negative 24-volt direct or alternating current feed on the other cable. The remote power source may be any other type of device that has an electrical power output, such as a transformer which can transform a high voltage alternating current source into a low voltage alternating current output. Those skilled in the art will recognize many other types of remote power source that would be suitable for these purposes.

The light source may be any type of light source which requires a low voltage input. As the economic and environmental costs associated with power generation increase, light sources have been developed which have low power requirements. These low power light sources include LED lights, compact fluorescent bulbs, and other similar sources. Because these light sources do not require as much electrical energy, they can be powered by a low voltage power source via low voltage suspension cables.

FIGS. 4A and 4B depict an example ceiling-mounted non-adjustable cable coupler 401, in both assembled and exploded views, respectively. Ceiling mount 401 requires a low voltage suspension cable 101 with a swaged sleeve 202. When low voltage suspension cable 101 is inserted through non-adjustable cable coupler 403, swaged sleeve 202 sits inside of non-adjustable cable coupler 403. Insulating sleeve 409 is inserted onto cable 101 above swaged sleeve 202. Non-adjustable cable coupler 403 is inserted through insulating bushing 404 and bracket bar 405 such that the external threads on the body of non-adjustable cable coupler 403 extend below bracket bar 405. Bracket bar 405 is fixed to junction box 402 by screws 406. The portion of non-adjustable cable coupler 403 which extends below bracket 405 is passed through the ceiling (not shown) and through ceiling canopy 407. Coupler cap 408 has internal threads which engage the external threads of non-adjustable cable coupler 403 to secure the ceiling canopy 407 to the ceiling or other structure.

Figure 5B:
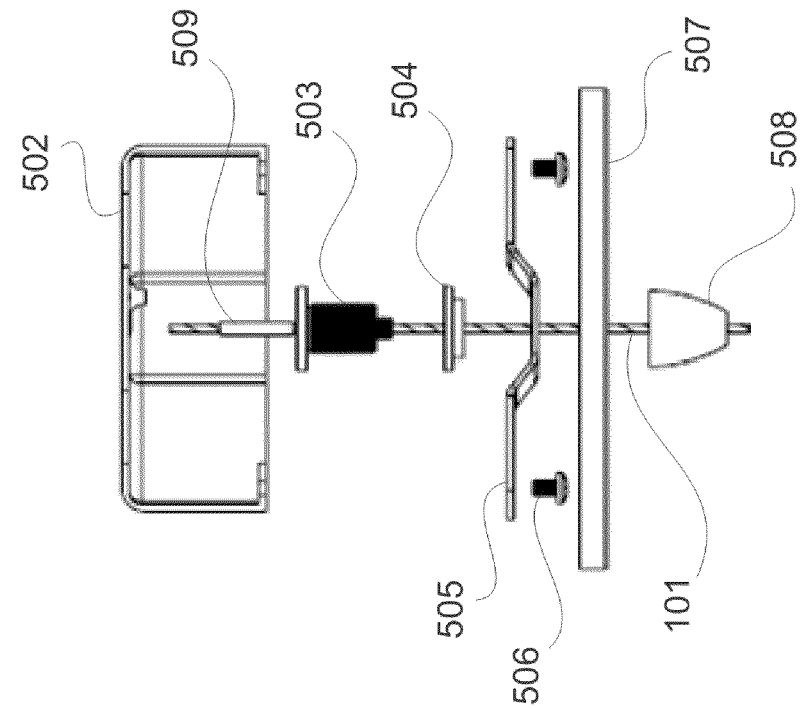
FIGS. 5A and 5B illustrate an example ceiling-mounted adjustable cable gripper.
Figure 5A:
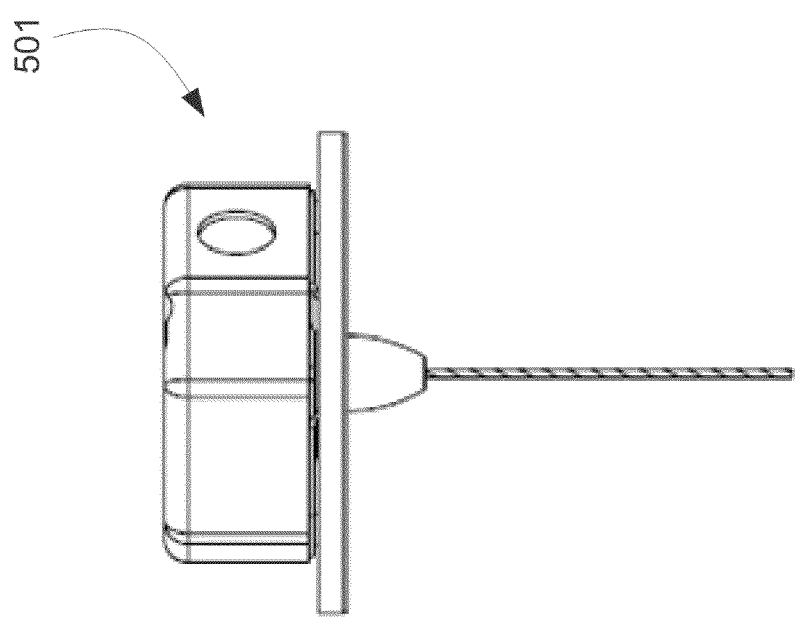

FIGS. 5A and 5B depict an example ceiling mounted adjustable cable gripper 501, in both assembled and exploded views, respectively. Ceiling mount 501 can utilize a low voltage suspension cable 101 without a swaged sleeve 202. Adjustable cable gripper 503 contains an internal 3-ball compression system which grips low voltage suspension cable 101 and locks it in place. With low voltage suspension cable 101 locked into adjustable cable gripper 503, the remaining portions of ceiling mount 501 are similar to those of ceiling mount 401. Adjustable cable gripper 503 in inserted through insulating bushing 504 and bracket bar 505. Bracket bar 505 is secured to junction box 502 using screws 506. The portion of adjustable cable gripper 503 which extends below bracket 505 is passed through the ceiling (not shown) and through ceiling canopy 507. The internal threads of coupler cap 508 engage the external threads of adjustable cable gripper 503 to secure the ceiling canopy 507 to the ceiling or other structure. Insulating sleeve 509 is inserted onto cable 101 above adjustable cable gripper 503

The components of first ceiling mount 401 and second ceiling mount 501 can be composed of a variety of materials. In one embodiment, non-adjustable cable coupler 403, adjustable cable gripper 503, and coupler caps 408 and 508 are composed of nickel plated brass; brackets bars 405 and 505 are composed of zinc plated steel; and, insulating bushings 404 and 504 and ceiling canopies 407 and 507 are composed of nylon 6/6. Insulating sleeves 409 and 509 are composed of PVC. Those of ordinary skill in the art will recognize that a number of other materials can be readily used as substitutes for those described above.

Figure 6B:
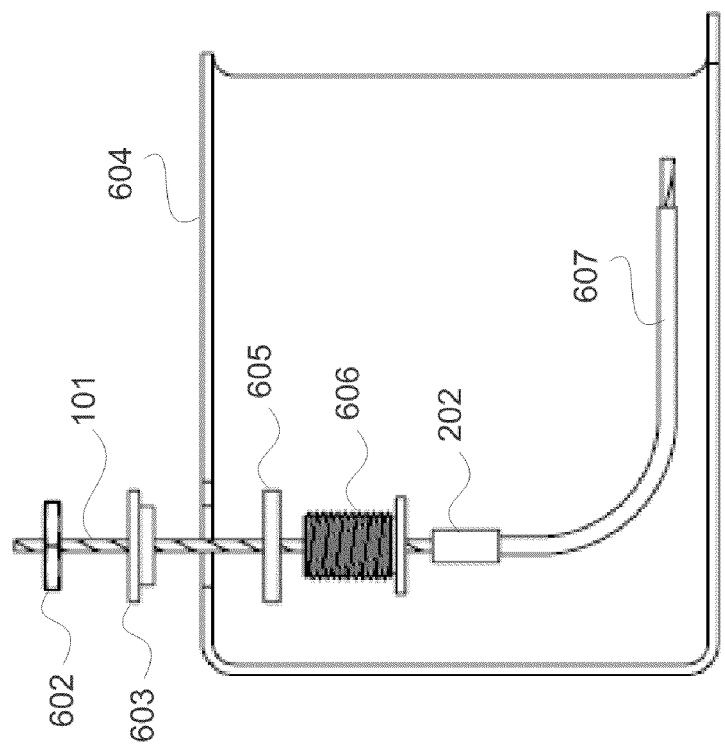
FIGS. 6A and 6B illustrate an example fixture-mounted non-adjustable cable coupler.
Figure 6A:
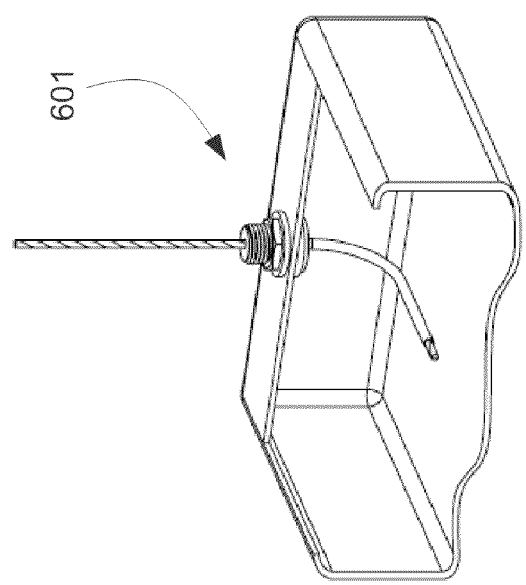

FIGS. 6A and 6B depict an example non-adjustable fixture mount 601, in both assembled and exploded views, respectively. First ceiling mount 601 requires a low voltage suspension cable 101 with a swaged sleeve 202. When low voltage suspension cable 101 is inserted through cable coupler 606, swaged sleeve 202 sits inside of cable coupler 606. Insulating sleeve 607 is inserted onto cable 101 below swaged sleeve 202. Cable coupler 606 is inserted through insulating bushing 605, through the top of luminaire assembly 604, and through insulating bushing 603. Cable coupler 606 is secured to fixture assembly 604 with nut 602, where the internal threads of nut 602 engage the external threads of cable coupler 606.

Figure 7B:
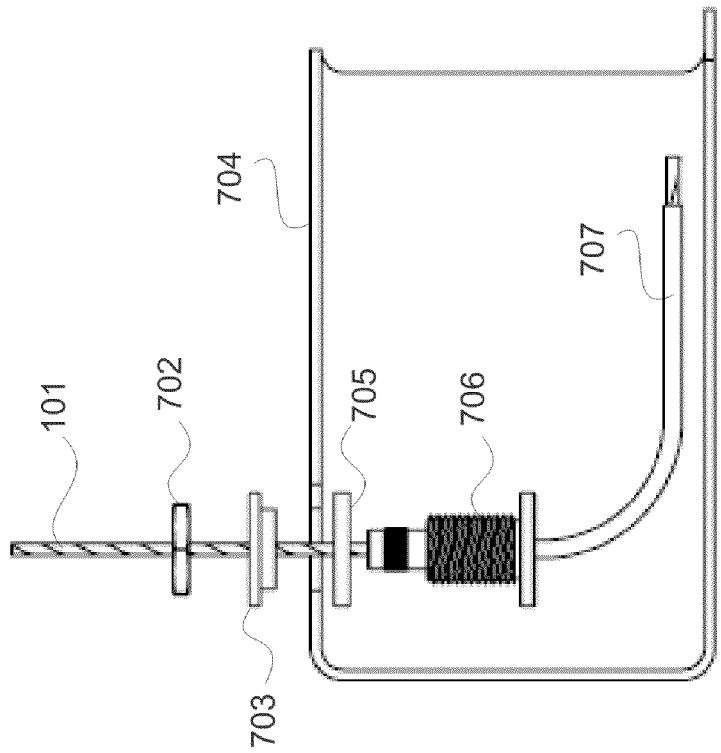
FIGS. 7A and 7B illustrate a first example fixture-mounted adjustable cable gripper
Figure 7A:
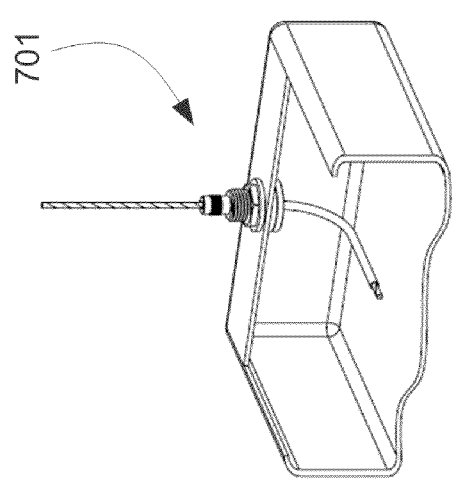

FIGS. 7A and 7B depict an example first adjustable fixture mount 701, in both assembled and exploded views, respectively. First adjustable fixture mount 701 can utilize a low voltage suspension cable 101 without a swaged sleeve 202. Adjustable cable gripper 706 contains an internal 3-ball compression system which grips low voltage suspension cable 101 and locks it in place. Low voltage suspension cable 101 is inserted through insulating bushing 705, through luminaire assembly housing 704, and through insulating bushing 703 Adjustable cable gripper 706 is secured to fixture assembly housing 704 with nut 702, where the internal threads of nut 702 engage the external threads of cable gripper 706. Insulating sleeve 707 is inserted onto cable 101 below adjustable cable gripper 706.

Figure 8B:
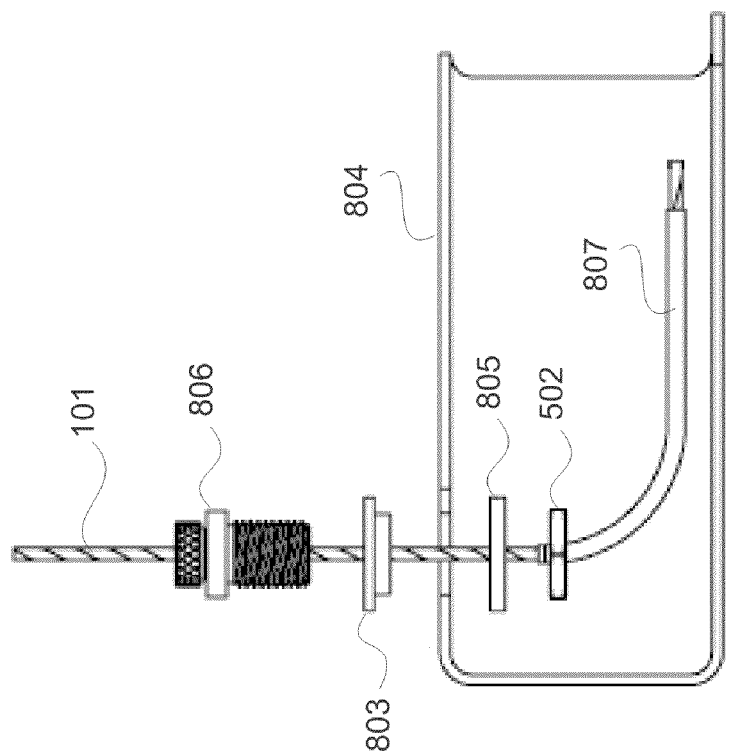
FIGS. 8A and 8B illustrate a second example fixture mounted adjustable cable gripper.
Figure 8A:
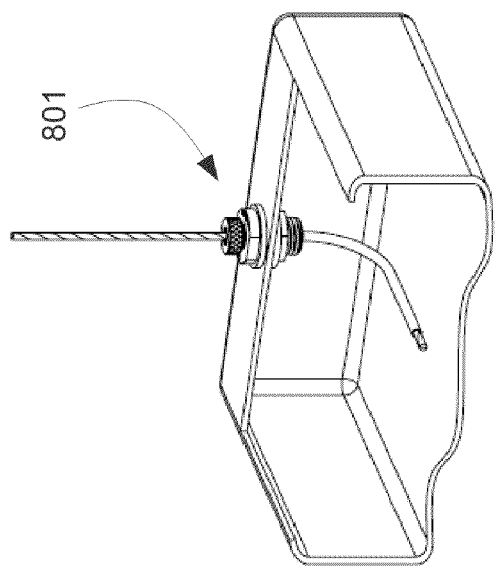

FIGS. 8A and 8B depict an example second adjustable fixture mount 801, in both assembled and exploded views, respectively. Second adjustable fixture mount 801 can utilize a low voltage suspension cable 101 without a swaged sleeve 202. Adjustable cable gripper 806 grips low voltage suspension cable 101 securely and locks it in place. Adjustable cable gripper 806 differs from adjustable cable gripper 706 in external design only: Adjustable cable gripper 706 is inserted into luminaire assembly housing 704 from below the housing wall and adjustable cable gripper 806 is inserted into luminaire assembly housing 804 from above the housing wall. Low voltage suspension cable 101 is inserted through insulating bushing 803, through luminaire assembly housing 804, and through insulating bushing 805. Cable gripper 806 is secured to fixture assembly housing 804 with nut 802, where the internal threads of nut 802 engage the external threads of cable gripper 806. Insulating sleeve 807 is inserted onto cable 101 below cable gripper 806. Those of ordinary skill in the art will recognize that a number of other adjustable cable gripper designs can be readily used as substitutes for those described above.

The components of non-adjustable fixture mount 601, the first adjustable fixture mount 701, and the second adjustable fixture mount 801 can be composed of a variety of materials. In one embodiment, non-adjustable cable couplers and adjustable cable grippers 606, 706, and 806 are composed of nickel plated brass; and bushings 603, 605, 703, 705, 803, and 805 are composed of nylon 6/6; insulating sleeves 607, 707, and 807 are composed of PVC Those of ordinary skill in the art will recognize that a number of other materials can be readily used as substitutes for those described above.

Referring back to the example luminaire assembly system depicted in FIG. 3, the ceiling mounts 303 and the fixture mounts 305 can be any of the above example mounts or similar mounts. Among the possible pairings of ceiling mounts 303 with fixture mounts 305, and the associated low voltage cable required, include those described in Table 1.

TABLE 1

Possible pairings of low ceiling and fixture mounts

| Ceiling Mount | Fixture Mount | Low Voltage Cable |
| --- | --- | --- |
| First ceiling mount 401 | First fixture mount 601 | Swaged sleeve 202 at both ceiling and fixture end |
| First ceiling mount 401 | Second fixture mount 701 | Swaged sleeve 202 at ceiling end |
| First ceiling mount 401 | Third fixture mount 801 | Swaged sleeve 202 at ceiling end |
| Second ceiling mount 501 | First fixture mount 601 | Swaged sleeve 202 at fixture end |
| Second ceiling mount 501 | Second fixture mount 701 | No swaged sleeve 202 required |
| Second ceiling mount 501 | Third fixture mount 801 | No swaged sleeve 202 required |

Figure 9B:
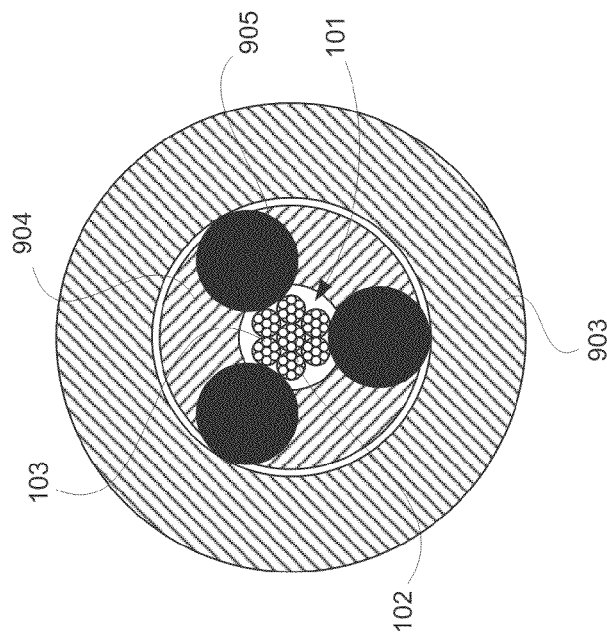
FIGS. 9A and 9B illustrate an example 3-ball adjustable cable gripper.
Figure 9A:
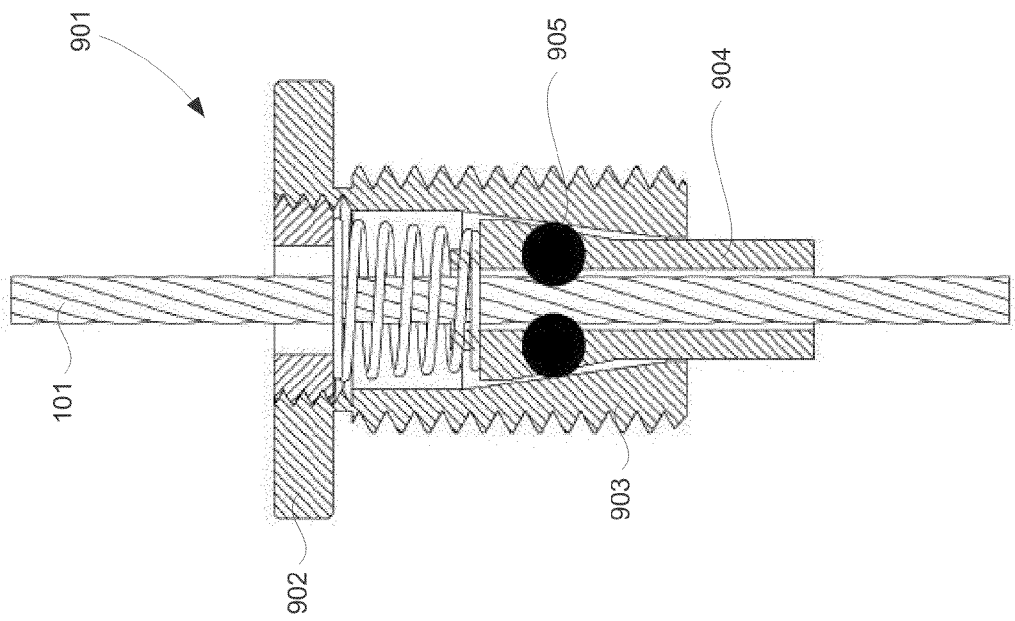

FIGS. 9A and 9B illustrate an example 3-ball adjustable cable gripper 901. In the embodiment shown in FIG. 9A, the adjustable cable gripper 901 has a stop flange 902 and a threaded body 903. When installed, the threaded body 903 is inserted in a through hole of a ceiling, a fixture, or other structure (not shown) until the stop flange 902 comes into contact with the structure. FIG. 9A depicts a sectional view of threaded body 903 with the top half removed. An internal conical cylinder 904 is inside of threaded body 903, and is also depicted in a sectional view with the top half removed. The threaded body 903 surrounds the internal conical cylinder 904 that, in turn, contains three balls 905. If a downward force is exerted on the low voltage suspension cable 101, the cable will transmit the downward force on the internal conical cylinder 904. This downward force on the internal conical cylinder 904 causes the balls 905 to be compressed between the threaded body 903 and the low voltage suspension cable 101. This compression of the balls 905 causes a lateral force to be applied from each ball 905 toward the axis of the low voltage suspension cable 101. These lateral forces prevents the low voltage suspension cable 101 from moving downward, despite the force pulling the low voltage suspension cable 101 downward.

FIG. 9B depicts a sectional view looking down the axis of the low voltage suspension cable 101. As depicted, low voltage suspension cable 101 includes conductive strand 102 and strength strands 103. Also depicted are sectional views of the threaded body 903, the internal conical cylinder 904, and the three balls 905. As can be seen, the balls come into direct contact with the outer edge of the low voltage suspension cable 101. If a polymer or elastomer insulation jacket were used on the outside of low voltage suspension cable 101, the lateral forces applied by the balls would permanently deform the insulation (e.g., tearing or stretching the insulation). Further, a polymer or elastomer insulation jacket does not have the tensile strength required to support a hanging fixture.

The foregoing description has set forth various embodiments of the system and components via the use of diagrams and examples. While the present disclosure has been described in connection with the preferred embodiments of the various figures, it is to be understood that other similar embodiments may be used or modifications and additions may be made to the described embodiment for performing the same function of the present disclosure without deviating there from. Therefore, the present disclosure should not be limited to any single embodiment, but rather construed in breadth and scope in accordance with the appended claims. Additional features of this disclosure are set forth in the following claims.

What is claimed is:

1. A hanging electrically-powered assembly system, comprising:
an electrically-powered assembly;
at least two fixture mounts attached to the electrically-powered assembly;
at least two structure mounts attached to a structure;
a power source remote from the electrically-powered assembly;
at least two conductive and uninsulated cables each connected to one structure mount and to one fixture mount, wherein at least one of the fixture mounts or the structure mounts including a non-adjustable cable coupler and at least one of the two conductive cables including a swaged sleeve sitting in the cable coupler, and
wherein each conductive cable comprises:
a conductive strand composed of a first metallic material, the conductive strand connecting the power source to the electrically-powered assembly, and
a plurality of strength strands wound around the conductive strand, the plurality of strength strands composed of a second metallic material.

2. The system of claim 1, wherein the hanging electrically-powered assembly is a luminaire fixture assembly comprising a light source.

3. The system of claim 2, wherein the light source comprises at least one low voltage, low power light.

4. The system of claim 1, wherein the first structure mount comprises a non-adjustable cable coupler, and wherein the swaged sleeve of the first conductive cable sits in the non-adjustable cable coupler of one structure mount.

5. The system of claim 4, wherein the first fixture mount comprises an adjustable cable gripper, and wherein the end of the first cable further from the swaged sleeve is attached to the adjustable cable gripper of one fixture mount.

6. The system of claim 1, wherein the first structure mount comprises an adjustable cable gripper, and wherein the end of the first cable further from the swaged sleeve is attached to the cable gripper of one structure mount.

7. The system of claim 1, wherein each remote power source is configured to provide a positive 30-volt or less direct current feed via a first conductive cable, and to provide a negative 30-volt or less direct current feed via a second conductive cable.

8. The system of claim 1, wherein the first metallic material is one of the following: copper, a copper alloy or a non-cuprous, highly conductive material; and wherein the second metallic material is one of the following: steel, stainless steel or other high tensile strength, high lateral compressive strength material.

9. The system of claim 1, wherein the conductive strand of each conductive cable comprises a plurality of conductive wires.

10. The system of claim 1, wherein at least one of the plurality of strength strands of each conductive cable comprises a plurality of strength wires.

11. A hanging electrically-powered assembly system, comprising:
means for consuming electricity;
at least two means for mounting to a fixture attached to the means for consuming electricity;
at least two means for mounting to a structure attached to a structure;
means for providing power remote from the means for consuming electricity;
at least two means for hanging each connected to one means for mounting to a fixture and to one means for mounting to a structure, the means for hanging uninsulated and wherein at least one of the means for mounting to a structure or means for mounting to a fixture including a non-adjustable cable coupling means and at least one of the two means for hanging including a swaged sleeve sitting in the cable coupling means, wherein each means for hanging further comprises:
means for conducting composed of a first metallic material, the means for conducting connecting the means for providing power to the means for consuming electricity, and
means for providing tensile strength wound around the means for conducting, the means for providing tensile strength composed of a second metallic material.

12. A hanging electrically-powered assembly system, comprising:
an electrically-powered assembly;
at least two fixture mounts attached to the electrically-powered assembly;
at least two structure mounts attached to a structure;
a power source remote from the electrically-powered assembly;
at least two conductive and uninsulated cables each connected to one structure mount and to one fixture mount, wherein at least one of the fixture mounts or the structure mounts including an adjustable cable gripper that adjustably fits about at least one of the two conductive cables, and wherein each conductive cable comprises:

a conductive strand composed of a first metallic material, the conductive strand connecting the power source to the electrically-powered assembly, and a plurality of strength strands wound around the conductive strand, the plurality of strength strands composed of a second metallic material.

13. The system of claim 12, wherein the hanging electrically-powered assembly is a luminaire fixture assembly comprising a light source.

14. The system of claim 12, wherein the light source comprises at least one low voltage, low power light.

15. The system of claim 12, wherein the first conductive cable comprises a swaged sleeve near one end of the first conductive cable.

16. The system of claim 12, wherein each remote power source is configured to provide a positive 30-volt or less direct current feed via a first conductive cable, and to provide a negative 30-volt or less direct current feed via a second conductive cable.

17. The system of claim 12, wherein the first metallic material is one of the following: copper, a copper alloy or a non-cuprous, highly conductive material; and wherein the second metallic material is one of the following: steel, stainless steel or other high tensile strength, high lateral compressive strength material.

18. The system of claim 12, wherein the conductive strand of each conductive cable comprises a plurality of conductive wires.

19. The system of claim 12, wherein at least one of the plurality of strength strands of each conductive cable comprises a plurality of strength wires.

* * * * *